United States Patent
Woodard et al.

(10) Patent No.: US 6,692,062 B1
(45) Date of Patent: Feb. 17, 2004

(54) LUXURY MOTOR COACH CONVERSION

(75) Inventors: Eric Morris Woodard, Greensboro, NC (US); Donald Wayne Clapp, Greensboro, NC (US)

(73) Assignee: Morphos Design, Inc., Greensboro, NC (US)

( * ) Notice: Subject to any disclaimer, the term of this patent is extended or adjusted under 35 U.S.C. 154(b) by 0 days.

(21) Appl. No.: 10/146,180

(22) Filed: May 15, 2002

Related U.S. Application Data (60) Provisional application No. 60/292,261, filed on May 15, 2001.

(51) Int. Cl.[7] .................................................. B60P 3/32
(52) U.S. Cl. .................... 296/164; 296/166; 296/26.04; 296/24.1; 296/25
(58) Field of Search .................... 410/26, 24; 296/158, 296/164, 165, 166, 168, 26.04, 178, 183, 181, 182, 190.01, 190.02, 24.1, 25; 180/89.11, 89.12, 89.1; 414/537; 29/401.1

(56) References Cited

U.S. PATENT DOCUMENTS

| | | | | |
|---|---|---|---|---|
| 1,798,011 A | * | 3/1931 | Cernuda | 296/178 |
| 3,961,716 A | * | 6/1976 | Renaud | 296/158 |
| 4,898,418 A | * | 2/1990 | Lind et al. | 296/181 |
| 5,004,293 A | * | 4/1991 | Thomas | 296/166 |
| 5,078,441 A | * | 1/1992 | Borskey | 296/165 |
| 5,301,997 A | * | 4/1994 | Cudden | 296/183 |
| 5,390,945 A | * | 2/1995 | Orr | 280/81.5 |
| 5,833,294 A | * | 11/1998 | Williams et al. | 296/24.1 |
| 5,967,583 A | * | 10/1999 | Wishart | 296/24.1 |
| 6,325,447 B1 | * | 12/2001 | Kuo | 296/165 |

OTHER PUBLICATIONS

"Hit the highway in a rolling home", Houston Chronicle web site, Aug. 26, 1998, pp. 1–3.*
"Powerhouse Coach", powerhousecoach.com, printed out May 14, 2003, pp. 1–2.*
Kingsley Coach, Inc. pages from webcite www.kingsley-coach.com as accessed in May 2002.

* cited by examiner

*Primary Examiner*—Dennis H. Pedder
*Assistant Examiner*—Jason Morrow
(74) *Attorney, Agent, or Firm*—Gardner Carton & Douglas LLP

(57) ABSTRACT

A motor coach is provided as well as a method of manufacturing a luxury motor coach conversion from a semi tractor, for example, a class 8 sleeper. The motor coach utilizes the sleeper portion of the original truck body and includes a rear body portion that is mounted to a frame of the tractor rearwardly of the sleeper portion. In an embodiment, the motor coach is manufactured by removing a significant portion of a rear panel of the sleeper portion, mounting the rear body against the sleeper, and securing a flange over a seam between the rear body and the sleeper. In an embodiment, the motor coach has multiple occupiable levels including an elevated level and a lower level which has a sunken floor that is vertically lower than the truck frame. Optionally, the motor coach includes a garage having a tiltable floor that supports an auxiliary vehicle during travel and pivots to slope downwardly for loading and unloading the auxiliary vehicle.

4 Claims, 8 Drawing Sheets

LUXURY MOTOR COACH CONVERSION

FIELD OF THE INVENTION

The present invention generally relates to recreational motor vehicles and more particularly relates to a motor coach and method for converting a semi tractor into a motor coach.

BACKGROUND OF THE INVENTION

It is known to make a luxury motor coach by modifying a standard semi tractor to include to an extended rear body structure that provides interior living space. Such a motor coach and a process for making such a motor coach are generally referred to as a "conversion." The interior can be equipped for use as living quarters, mobile office space, or a display area. Tractors are commercially available with various types of standard, original equipment (OE) truck bodies or cabs. In general, the conversion involves cutting away a portion of the standard truck body and mounting an extended rear body that is joined to a rear of the truck body.

Conventional motor coach conversions are commonly based on a small sized tractor, e.g., classes 5, 6 or 7, in which the standard truck body is typically not equipped with a "sleeper" section rearward of the driver compartment. A conversion on such a small tractor has conventionally included cutting a small opening in the back wall of the cab then adding a custom rear body mounted rearward of the standard body. The small opening provides limited access between the driver compartment and does not allow for full stand-up headroom as a person passes between the driver compartment and the rear body. The small opening undesirably shuts off the driver and co-driver from interaction with the rest of the passengers in the rear living space.

Some motor coach conversions have been known which are based on a large sized tractor, e.g., class 8, which has a sleeper section. However, during a process of converting the tractor into a luxury motor coach, the sleeper section has conventionally been cut off behind the front seats and discarded, and custom rear body components are mounted to replace the removed sleeper portion. Unfortunately, the removal of the sleeper portion compromises the structural integrity of the remaining OE body. Additionally, a fiberglass cap has been provided in some conversions to join the truncated OE body to the custom rear body. Unfortunately, such caps have been known provide a poor seal that leaks water.

When traveling in a luxury motor coach, it is desirable to bring an auxiliary vehicle. The auxiliary vehicle has conventionally been towed behind the motor coach on a trailer. A few motor coaches have included a self-contained garage, however, improvements are needed to the garages of conventional motor coaches.

A need exists for a motor coach in which an a rearearward of the driver compartment is open with full stand-up headroom allowing free movement and access to and from the cab to the tractor. A need further exists for an unobstructed view forward from inside the living areas of the truck conversion. Additionally, a need exists for a motor coach having an improved garage.

SUMMARY OF THE INVENTION

The present invention addresses the deficiencies of the prior art and provides an improved motor coach and process for converting a semi tractor into a luxury motor coach. For example, in an embodiment, a motor coach is manufactured by converting a truck into a luxury motor coach which generally includes providing a semi tractor having a standard "sleeper" style body (commonly referred to as a "class 8" tractor or "class 8 sleeper"), removing a portion of the rear panel of the sleeper, and mounting a rear body portion to a frame of the tractor rearwardly of remaining walls of the sleeper portion of the standard body. In an embodiment, the process further includes lengthening the frame of the tractor. The lengthening may result in lengthening the wheelbase and/or lengthening the frame rearwardly from the rear axles. Furthermore, the step of removing a portion of the rear panel includes cutting the rear panel at a distance from the sides and a top of the sleeper portion to form a flange of remaining material of the rear panel which extends inwardly from sides and a top sleeper portion. The remaining strip of material that forms the flange preferably has a width from about 6 inches to about 9 inches. A front edge of the rear body is matably mounted to the flange, preferably providing a flexible bushing between the rear body and the flange to provide a weathertight seal. Additionally, in an embodiment, the rear body has a cooperatively shaped flange that generally matches the shape of the front body portion. Advantageously, the conversion process of the invention provides an interior space in which the sleeper portion opens into the rear body portion as part of the living area of the vehicle. This allows for standing headroom rearward from the driver compartment. It also allows for a greater flexibility in the design given the open, cathedral-like design offered by a class 8 sleeper tractor. Additionally, utilizing the sleeper portion of the OE body results in a smooth, aerodynamic, and aesthetically pleasing interface between the tractor and the custom designed body.

The invention also includes motor coach constructed in accordance with the conversion process, wherein the standard body portion contains a driver compartment, an engine compartment generally forward of the driver compartment, and a sleeper portion rearward of the driver compartment, the standard body portion having a rear panel with a cutout therein so that the rear panel defines a flange extending inwardly a distance of about 6 inches to about 9 inches along a top and sides sleeper portion. The rear body portion is mounted to the frame rearward of the front body portion, wherein the rear body portion is matably mounted to the flange to define an open interior space from the sleeper portion into the rear body portion. In an embodiment, the rear body has a flange that mates against the flange of the sleeper body. Preferably, a flexible bushing is additionally mounted be between the rear body portion and the front body portion to provide a watertight seal. The rear body portion may be mounted to the flange by welding and/or bolts.

In an embodiment, the present invention provides a motor coach wherein the rear body portion has multiple levels with sufficient headroom to permit an average person to stand at least partially erect, the multiple levels including an elevated level having a floor on or above the frame and a lower level having a floor below the frame. The lower room is narrow in configuration, disposed between the truck frame and a side of the rear body portion. The lower room can be configured with limited headroom or full headroom, depending on the design in conjunction with the elevated living space above. Desirably, the lower room at least has headroom sufficient to permit a person to stand partially erect, e.g., standing on one's feet although crouched over. In an embodiment, a lower suite is provided by a pair of lower rooms, one on each side of the frame, and a pass-through space positioned over the frame which extends between the pair of rooms. The suite generally straddles the frame, and the pass-through space is suitable for a use as a bed.

In an embodiment, the motor coach is capable of transporting an auxiliary vehicle. In such an embodiment, the motor coach includes a truck frame having a front end with a front axle and a rear end with at least one rear axle, the frame including at least one rail extending generally horizontally between the front and rear ends. A front body portion is mounted generally near the front end of the frame, the front body portion containing a driver compartment and an engine compartment generally forward of the driver compartment. A rear body portion is mounted to the frame behind the front body portion, the rear body portion including a living section and a garage section, the garage positioned at a rear of the motor coach and the living space extending between the garage and the front body portion. A garage floor is provided to support an auxiliary vehicle inside the garage section of the rear body portion, the garage floor including a tiltable floor panel mounted to the frame for pivotable movement between a raised position in which the tiltable is elevated above the road and a lowered position in which the tiltable panel slopes downwardly toward the ground for loading and unloading the auxiliary vehicle. In an embodiment, the tiltable floor panel is generally horizontal in the raised position, and in another embodiment, the tiltable floor panel is sloped upward, beyond a horizontal level, in the raised position. The front end tiltable floor panel is pivotably mounted to the frame at a pivot joint. Preferably, the pivot joint is positioned generally near or over the rear axles. In an embodiment, the tiltable panel extends near or to the ground in the lowered position so that an automobile can roll from the ground onto the tiltable panel and vice versa. In another embodiment, however, the motor coach further includes pull-out ramps that provide a supplemental structure to extend between the tiltable panel and the ground. The tiltable panel may define the entire floor of the garage section, or the garage floor can include a stationary portion that extends forwardly adjacent to the tiltable portion.

In an embodiment, the motor coach includes an elevated floor that defines an elevated living space above at least a portion of the garage. This advantageously optimizes living space of the motor coach. Optionally, the motor coach can be equipped with a pop-up roof section to provide increased headroom in the living space when the motor coach is parked.

A motor coach constructed in accordance with teachings of the invention can be used for various purposes in diverse markets including entertainment, mobile corporate use, and recreation. For example, the motor coach can be configured as a mobile corporate conference center or a high-end recreational vehicle used for vacationing or for sporting events. The motor coach offers great flexibility for custom-purpose configurations, such as a mobile recording studio with a lounge or bunkhouse for the crew, or as a show car or race car transport with a shop and/or living section. A vendor configuration is also possible, wherein the lower room forms a kiosk that opens to the exterior through hinged panels in the rear body which, in an open position, folds against the side of the motor coach or is supported in an extended manner to form a countertop and/or awning.

An advantage of the pre sent invention is that it provides for easy engine diagnosis and repair completely form outside the truck conversion. Because of the placement of the engine on most traditional types of motor coaches and bus conversion, maintenance poses a problem. Most have rear mounted engines. In order to perform certain diagnosis and repairs, the engine must be accessed from inside the motor coach or bus conversion. Doing this without soiling the interior has been a challenge for some repair shops (including some chassis manufacturer's repair shops) whose mechanics have been working with oils and grease while repairing other vehicles. With this invention, the engine is in front in its own compartment. This provides easy engine access for diagnosis and repair at almost any major truck stop/service center anywhere in the country.

An advantage of the present invention is that it provides a motor coach having a front engine configuration, thereby reducing noise, vibration and fumes from penetrating the living space. The front engine location avoids hazards associated with rear-engine coaches, such as fires that could break out underneath sleeping or living areas. Moreover, a front engine coach provides enhanced safety acting as a "crush zone" in the event of a head-on collision.

Another advantage of the present invention is that it provides a motor coach that has improved load capacity. Because a motor coach according to the invention is based upon a standard semi tractor originally designed to pull a freight trailer, the motor coach has a load capacity that is much greater than that of a traditional motor coach or bus conversion.

A further advantage of the present invention is that it provides a motor coach having a specific, more formal foyer for receiving guests. With most conventional motor coaches and bus conversions, entry steps enter directly into living, entertaining or business areas of the vehicle.

Yet another advantage of the present invention is that it provides a motor coach that includes a private, securable, lower room. This lower room can be used as sleeping quarters for an older child or adult who would appreciate more privacy than may be available in living areas offered in a conventional motor coach or bus conversion. The lower room can also be outfitted as a kennel to comfortably and securely house pets. Various living and utility configurations are available for this "room".

An additional advantage of the present invention is that it enables the motor coach to safely transport an auxiliary vehicle, onboard, without sacrificing much needed interior living space. The auxiliary vehicle is used for sightseeing and running errands. In such cases, using the truck conversion would be impractical. The auxiliary vehicle would be protected from the normal wear and tear that occurs to traditionally towed vehicles. There would be no threat of rock damage or damage from other debris thrown up from the road. The auxiliary vehicle is also protected from possible vandalism that can happen if it is towed. The garage is a secure, fire-resistant enclosure outfitted with sensors that would alert the driver of potentially hazardous conditions. The auxiliary vehicle is always available. Owners would not have to rent or lease a vehicle once they arrived at their destination.

Additional features and advantages of the present invention are described in, and will be apparent from, the detailed description of the invention, the drawings, and the claims.

DETAILED DESCRIPTION OF THE DRAWINGS

Figure 1:
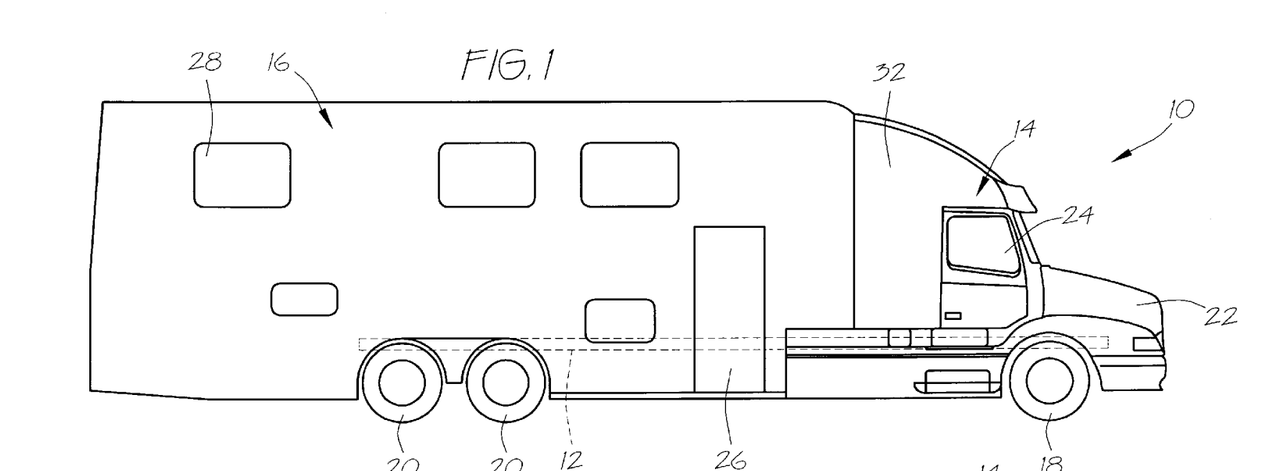
FIG. 1 is a side elevation of a luxury motor coach according to an embodiment of the present invention.
Figure 2:
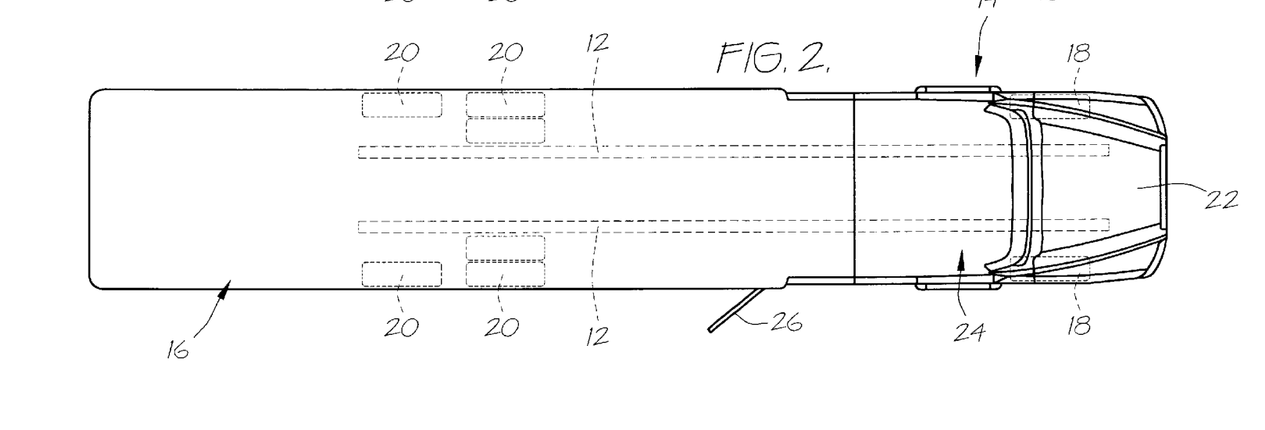
FIG. 2 is a plan view of the motor coach of FIG. 1.

Now referring to the drawings, wherein like numerals designate like components, a luxury motor coach 10 is illustrated in FIGS. 1, 2, 4a, 4b, and 5. Referring to FIGS. 1 and 2, the motor coach 10 generally has an elongate frame 12 (illustrated in phantom lines), a front body portion 14 mounted to a front end of the frame, and a custom rear body portion 16 that extends rearwardly from the front body portion 14. The motor coach 10 is adapted for highway travel, having a front axle with front wheels 18 at the front and a tandem set of rear axles having respective rear wheels 20 at a rear of the frame 12. The front body portion 14 includes an engine compartment 22 and a driver compartment 24. The rear body portion 16 can be provided in various interior configurations, as will be explained in greater detail below. The rear body portion 16 has a main door 26 for access to the interior of the motor coach 10 and multiple windows 28 positioned as desired and as dictated by the interior configuration. The main door 26 is preferably on a curb side of the motor coach 10.

Figure 3A:
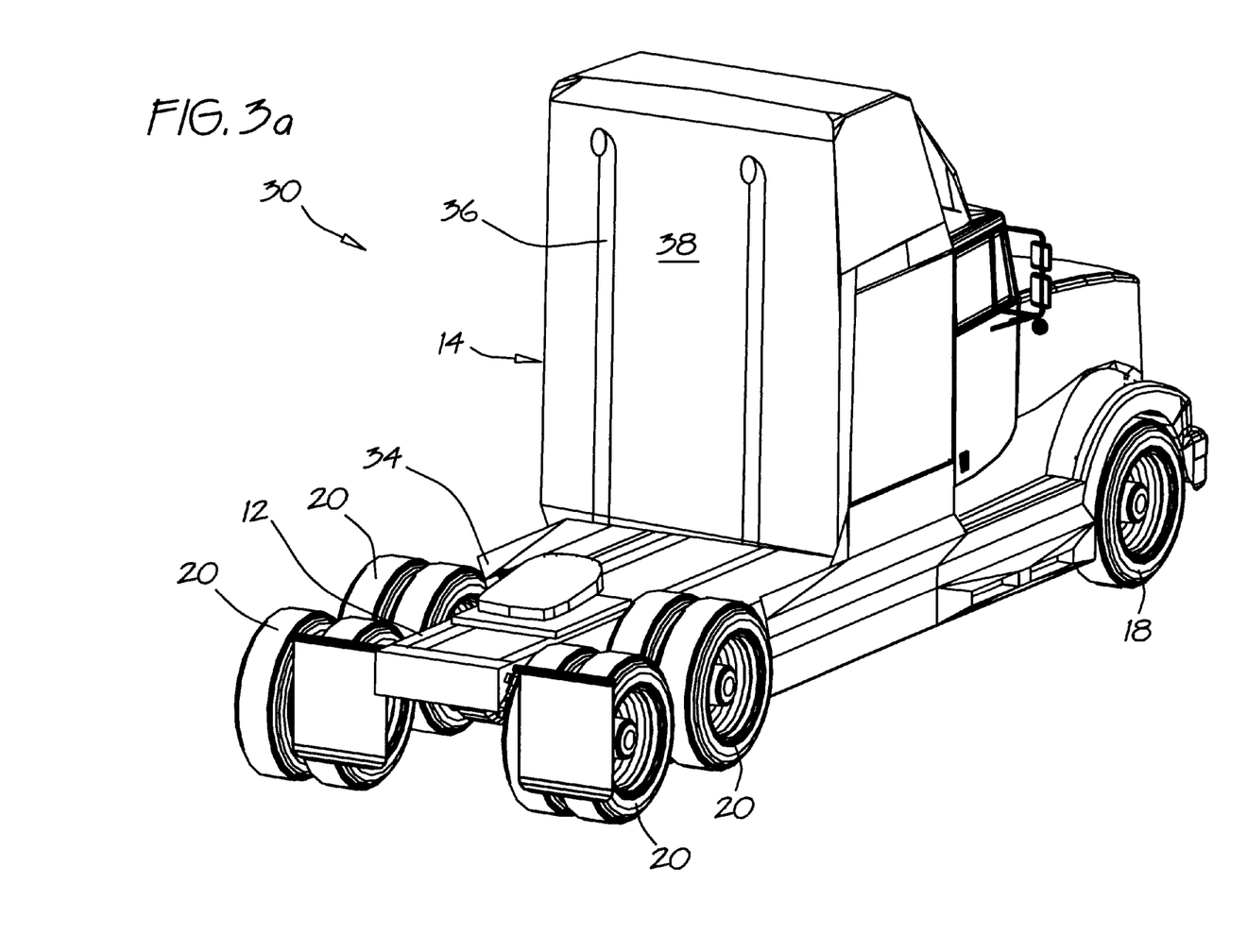
FIG. 3a is a perspective view of a standard class 8 sleeper tractor having an original equipment body and frame.

According to an aspect of the invention, the motor coach 10 is based upon a standard truck chassis having a standard sleeper body which serves as the front body portion 14. More specifically, in a preferred embodiment, the chassis is a class 8 semi tractor 30 having a standard body with a sleeper portion 32, an example of which is illustrated in FIG. 3a. The tractor 30 also includes a frame 12 having a pair of elongate, horizontal frame rails. The tractor 30 is conventionally equipped with a fifth wheel hitch 34 mounted on the frame rails 12 as would be needed for towing a freight trailer. Also, the tractor 30 has a pair of exhaust stacks 36 which, in some models, are disposed generally vertically behind a rear panel 38 of the sleeper portion 32.

Figure 3B:
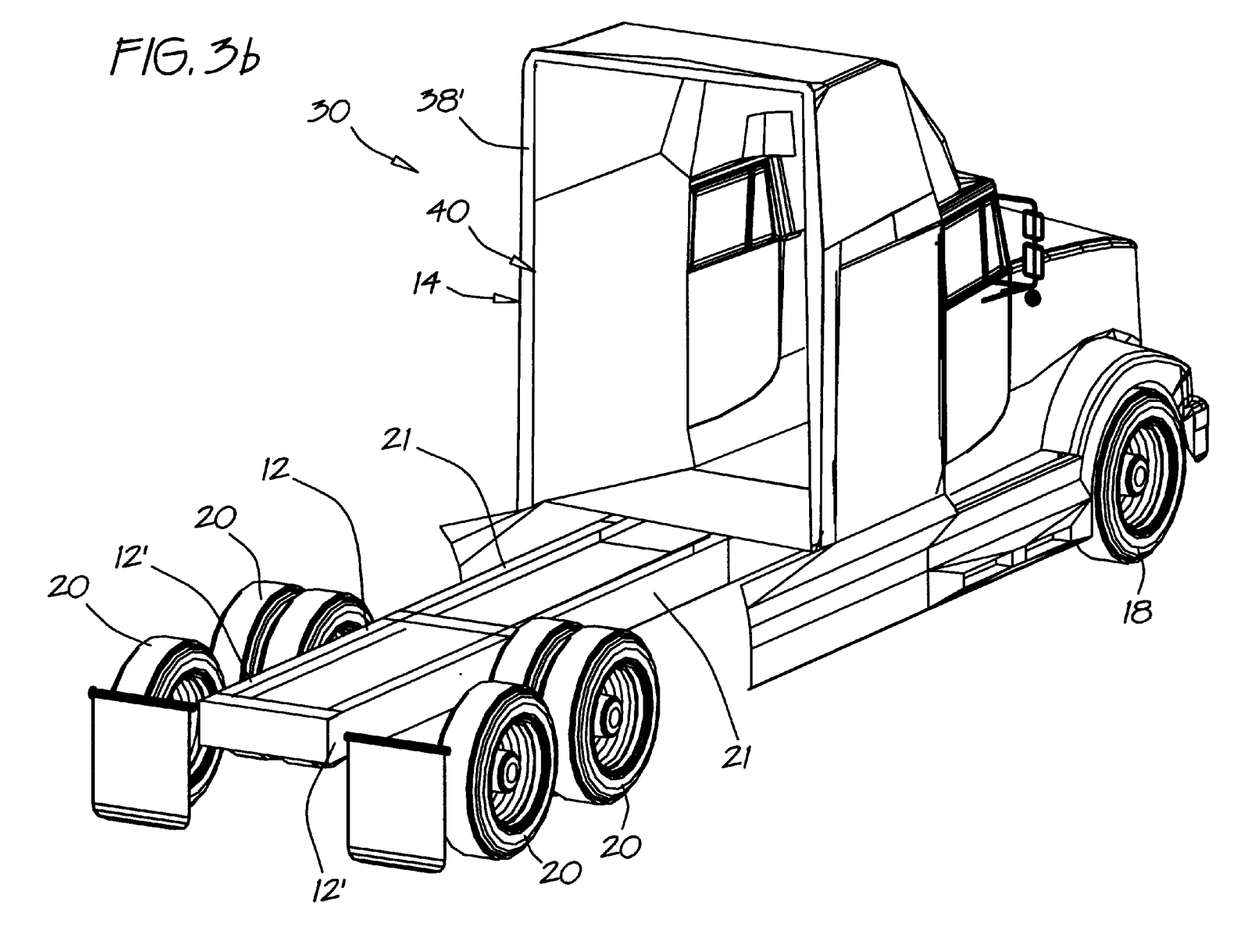
FIG. 3b is a perspective view of the tractor of FIG. 3a as modified during a process of converting the tractor into a motor coach.

In a conversion process according to an embodiment of the invention, a standard semi tractor 30 is provided as shown in FIG. 3a. A portion of the rear panel 38 of the sleeper portion 32 is removed by cutting, resulting in a cutout 40 as shown in FIG. 3b. The cutout 40 ultimately defines an opening for passing between the front body portion 14 and the rear body portion 16 of the motor coach 10, and accordingly, in order to optimize a feeling of continuous interior openness, the cutout 40 is as large as possible without significantly compromising the integrity of the remaining standard truck body. Preferably, the rear panel 38 (FIG. 3a) is cut at a distance from the sides and a top of the sleeper portion 32 to form a collar or flange 38' (FIG. 3b) of remaining material which extends inwardly from sides and a top sleeper portion. It has been found that a suitable flange 38' may have a width from about 6 inches to about 9 inches to maintain desired body integrity and to provide a desirably large opening. Of course, a suitable flange 38' could have a width of less than 6 inches or greater 9 inches depending on the particular original design, dimensions, quality and/or gauge of material of the front body portion 14. Additionally, an extension 12' is mounted to the frame 12 to extend rearwardly to provide supplemental support to the rear body portion. In an embodiment, the process can further include lengthening the frame 12 by adding a frame section 21 to increase the wheelbase.

Unneeded or interfering elements of the standard tractor 30 are removed or reconfigured. For example, the fifth wheel hitch 34 (FIG. 3a) is removed and, as appropriate for a particular tractor model, the exhaust stacks 36 (FIG. 3a) are replaced by a re-routed exhaust system (not shown). Any undesired interior components are removed from the sleeper portion 32, such as a conventional built-in bed, cabinets, or fixtures. If the tractor 30 is brand new, it may be possible to order the tractor 30 from its manufacturer without such elements to reduce cost and waste.

The conversion process next includes mounting the rear body portion 16 (see FIGS. 1, 2, 4a), wherein the rear body portion is mounted to the frame 12 rearward of the front body portion and matably mounted to the flange 38' (FIG. 3b) of the front body portion 14. In particular, a front edge of the rear body portion 16 is matably mounted to the flange 38', and in an embodiment, the front edge of the rear body portion 16 is shaped to have a flange matched in shape with the flange 38' of the front body portion 14. Preferably, a flexible bushing is positioned at the flange between the front and rear body portions 14, 16, which are then joined by welding and/or by bolts. The bushing avoids metal to metal abrasion and provides a weathertight seal.

Figure 4A:
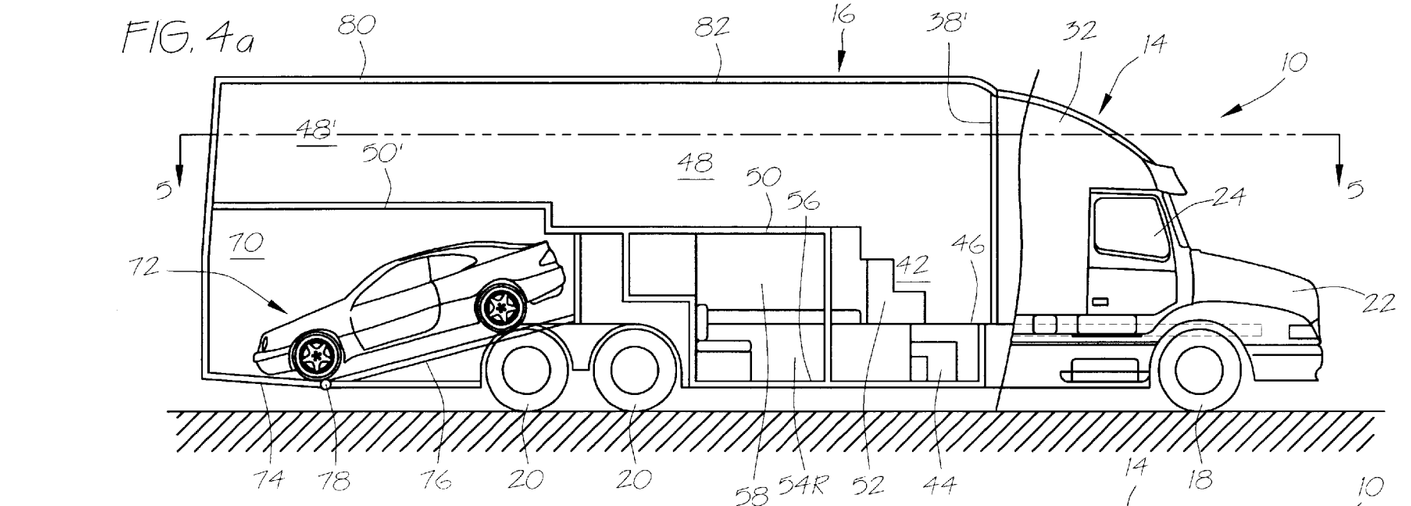
FIG. 4a is a schematic side view of the motor coach of FIG. 1, a portion of the wall broken away to show the interior floor configuration and garage, the garage having a tiltable floor panel that is in a raised position to stow an auxiliary vehicle and the pop-up roof section in a lowered position for travel.
Figure 5:
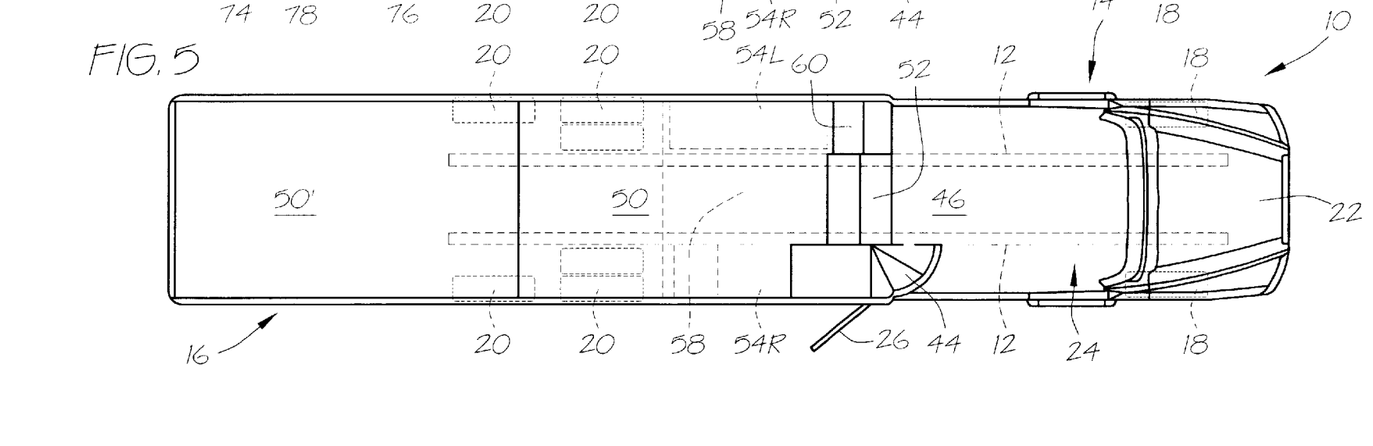
FIG. 5 is a schematic plan view of the motor coach of FIG. 4a, a portion of the roof broken away to show the elevated floor level, main floor level, and, interior stairs for accessing the elevated and lower levels, the frame of the tractor shown in phantom.

Turning to FIGS. 4a and 5, interior features of the motor coach 10 will be described. As a result of the conversion process described above, the motor coach 10 advantageously has a foyer 42 as defined by an interior space of the rear body portion 16 immediately rearward of the sleeper portion 32. (As used herein, the term "sleeper portion" refers to the rear body shell of the original tractor body and should not be construed to define the intended interior use or configuration of this portion of the conversion motor coach 10). A set of entry steps 44 ascends to the foyer from the main door. The foyer 42 has a floor 46 mounted generally on top of the frame 12, and the floor 46 is preferably contiguous and level through the front body portion 14. As person enters the foyer 42 at a top of the entry steps 44, the interior of the sleeper portion 32 is to the right, and a main living space 48 is to the left. In an embodiment, the main living space 48 has an elevated floor 50 which is elevated with respect to the frame 12 and vertically higher than the floor 46 of the foyer 42. A set of main floor steps 52 ascends from the foyer 42 to the main living space 48. In some configurations, the transition between the foyer 42 and the main living space 48 is open, providing an enhanced feeling of spaciousness to the occupants and allowing an occupant of the main living space 48 to overlook the foyer 42 and into the open front body portion 14.

An advantage of the present invention is that the motor coach 10 can be configured to provide a dramatic entry effect, wherein the foyer 42 can be open both frontwardly and rearwardly to the other interior areas. This may be especially desirable for executive entertaining purposes. Of course, the interior of the motor coach 10 can be equipped in various ways with furniture, built-ins, cabinets, wardrobes, fixtures, partitions and appliances depending on the desired use and layout.

According to an embodiment of the invention, as shown in FIGS. 4a and 5, the motor coach 10 includes one or more lower room 54L, 54R. In particular, each of the lower rooms 54R, 54L is a sunken occupiable space which has a floor 56 mounted lower than a level of the frame 12, between a respective outer sidewall of the motor coach and the frame 12. The lower room 54R, 54L is located under the elevated floor 50 of the main living space 48 forwardly relative to the rear wheels 20. Each of the lower rooms 54R, 54L can be configured with limited headroom or full headroom, depending on the design in conjunction with the elevated living space 48 above. The lower room 54R, 54L has at least enough headroom to permit a person to stand partially erect, e.g., standing on one's feet although crouched over. In an embodiment, two lower rooms 54R, 54L, one on each side of the frame 12, respectively, and the lower rooms 54R, 54L are joined by a pass-through space 58 positioned over the frame 12. Such a configuration advantageously provides a suite that generally straddles the frame 12, wherein the pass-through space 58 is suitable for a use as a bed. In an embodiment, the motor coach 10 can be outfitted in a vendor configuration wherein at least one of the lower rooms 54R, 54L can be utilized as a kiosk that opens exteriorly-through hinged panels in the rear body 16.

Figure 6A:
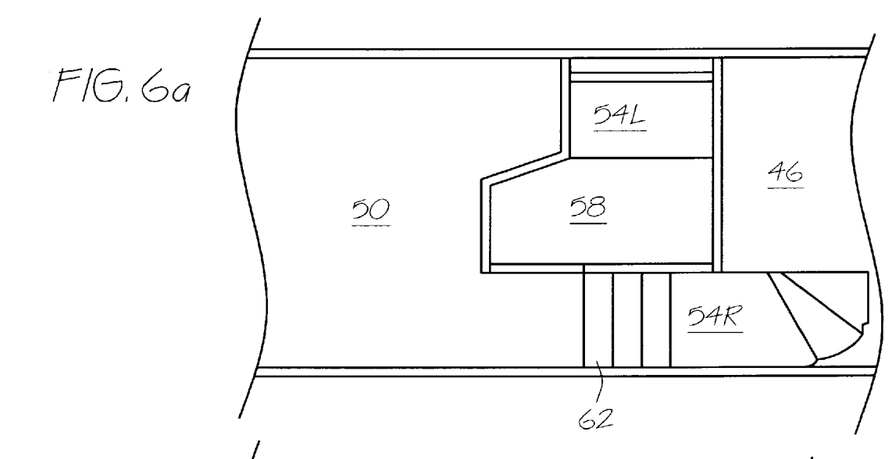
FIG. 6a is a schematic, fragmentary, sectional plan view of a motor coach having an alternative lower room configuration.
Figure 6B:
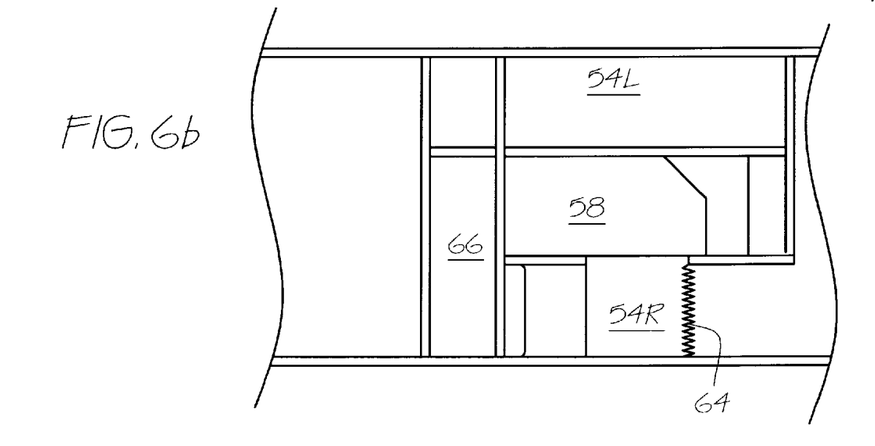
FIG. 6b is a schematic, fragmentary, sectional plan view of a motor coach having another alternative lower room configuration.

As illustrated in the embodiment of FIG. 5, a set of steps 60 provide access to the lower room 54L from the foyer 42. Alternative lower room configurations are illustrated in FIGS. 6a and 6b. In FIG. 6a, the lower room 54R forms an expanded entry area inside the main door 26, from which the entry steps 44 ascend forwardly to the foyer 42 and a second set of steps 62 ascends rearwardly to the main living space 48. In FIG. 6b, an interior privacy door 64 is provided adjacent to the main door 26 for access to a lower suite having a lower room 54R, 54L a pass-through bed 58 over the frame, and storage compartment 66.

In an embodiment, the motor coach includes an improved garage 70 that permits the storage and transport of an auxiliary vehicle 72, e.g., an automobile. The garage 70 is readily accessible for easy removal of the auxiliary vehicle 72, which is useful for side trips, sightseeing, or running errands. In particular, the garage 70 according to the present invention includes a tiltable floor panel 74 that pivots between a raised position, shown in FIG. 4a, and a lowered position, shown in FIG. 4b. In the raised position (FIG. 4a), the tiltable floor panel 74 holds the auxiliary vehicle 72 in a position elevated above the road for towing. In the lowered position (FIG. 4b), a rear edge of the tiltable floor 74 is moved toward the road, permitting the auxiliary vehicle to be driven in or out of the garage. In some embodiments, pull-out ramp extensions are used to provide a structure that extends from a rear edge of the tiltable floor panel 74 to the ground. The garage 70 is enclosed by the sides of the rear body 14 and a rear door to protect the auxiliary vehicle from the outdoor elements during transit.

Figure 4B:
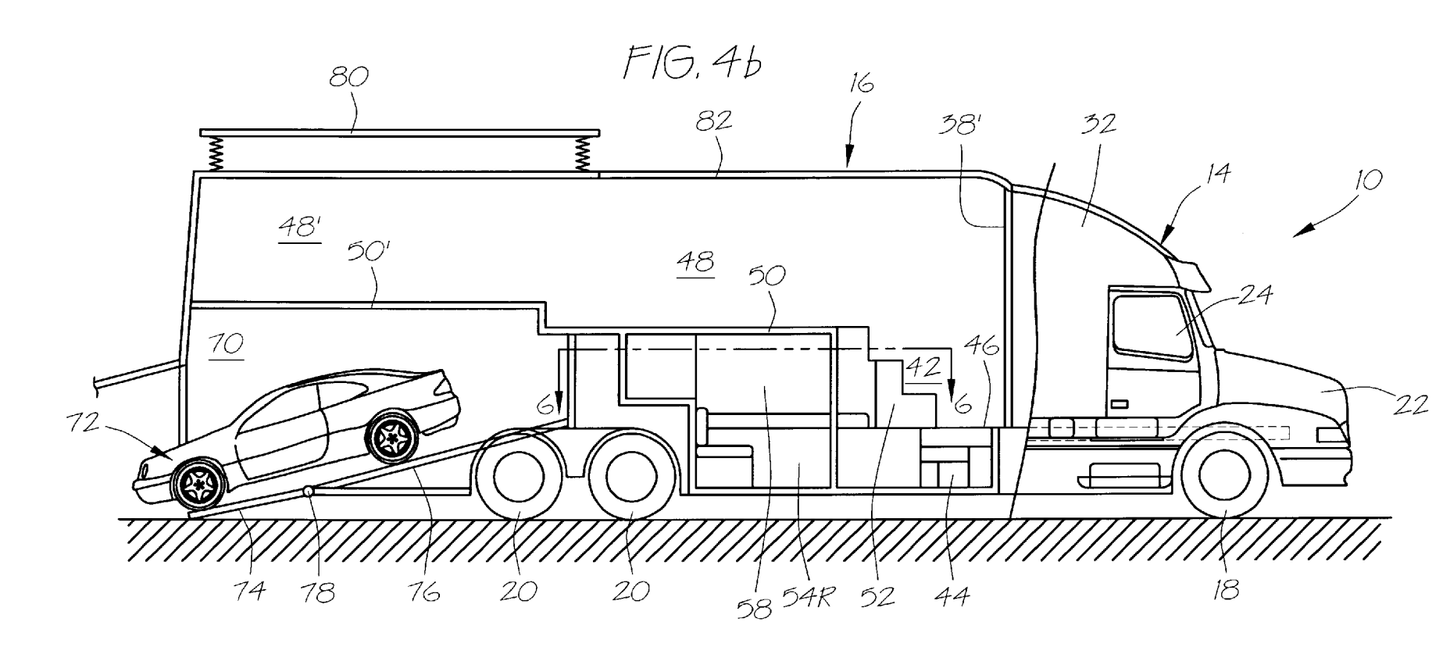
FIG. 4b is a schematic side view of the motor coach of FIG. 4a, the tiltable floor in a lowered position for loading or unloading the auxiliary vehicle and the pop-up roof section in a raised position.

In the embodiment illustrated in FIGS. 4a and 4b, the garage 70 also has a stationary floor panel 76 adjacently forward of the tiltable panel 74. The tiltable floor panel 74 preferably pivots at a joint 78 between the stationary floor panel 76 and the tiltable floor panel 74, and the tiltable floor panel 74 is movably driven by one or more hydraulic actuators as will be generally known to those of ordinary skill in the art. Additionally, a locking mechanism is provided to secure the tiltable panel in the raised position (FIG. 4a) for safe hauling.

Conventional wheel chocks or roller blocks are used to hold the auxiliary vehicle 72 securely during travel. In an embodiment, roller blocks are positioned in front and behind of the rear tires of the automobile 72 as it is loaded onto the garage floor 74, allowing the rear tires to roll as the tiltable panel 74 is moved to the raised position and locked. For suitable road clearance, a rear overhang of the motor coach 10 is angled upwardly in a rearward direction. The tiltable panel 74 is generally positioned at this overhang, and accordingly, the tiltable panel 74 is upwardly sloped relative to the auxiliary vehicle 72 when in the raised position (FIG. 4a). Because of this slope, gravity permits a forward-most rear tire block to be positioned in a final rest position of the auxiliary vehicle 72, preventing the auxiliary vehicle from rolling during travel. In an embodiment, a winch system is used to pull the car up into the garage 70. In particular, front tires of the auxiliary vehicle 72 nestle into a "tow dolly" that is pulled by a winch mounted at the stationary floor panel.

The garage 70 can be provided in various configurations depending on the size of auxiliary vehicle to be housed. Advantageously, the garage 70 of the present invention does not require the motor coach 10 to have a significant length behind the rear axle, allowing easier and safer maneuverability.

According to an embodiment, the motor coach 10 includes living space 48' above the garage 70. More particularly, as illustrated in FIGS. 4a and 4b, the motor coach 10 includes an elevated floor 50' that defines an elevated living space 48' above at least a portion of the garage. This advantageously optimizes interior living space. Optionally, the motor coach 10 can be equipped with a pop-up roof section 80 to provide increased headroom in the living space when the motor coach 10 is parked. The motor coach 10 includes a stationary roof section 82 over living space having adequate headroom. The pop-up roof section 80 is movable between a lowered position that is generally flush with the stationary roof section 82, as shown in FIG. 4a, and a raised position as shown in FIG. 4b that provides expanded interior headroom when the motor coach 10 is parked.

It will be recognized that the motorcoach 10 can be constructed in various configurations wherein the pop-up roof section 82 may have any length or position on the motor coach. For example, in an embodiment, the garage 70 is configured to have a floor section on top of the frame (level with floor 46) that occupies a substantial length of the motorcoach 10, for example the garage can have a length suitable to contain multiple cars. In such an embodiment the elevated living space 48' and the pop-up roof section 82 can extend over the entire length of the garage. Moreover, pop-up roof section 82 can be configured to expand upward by any needed height, permitting the vertical level of the elevated floor 50' to be built to provide any selected amount of headroom in the garage below.

Figure 7A:
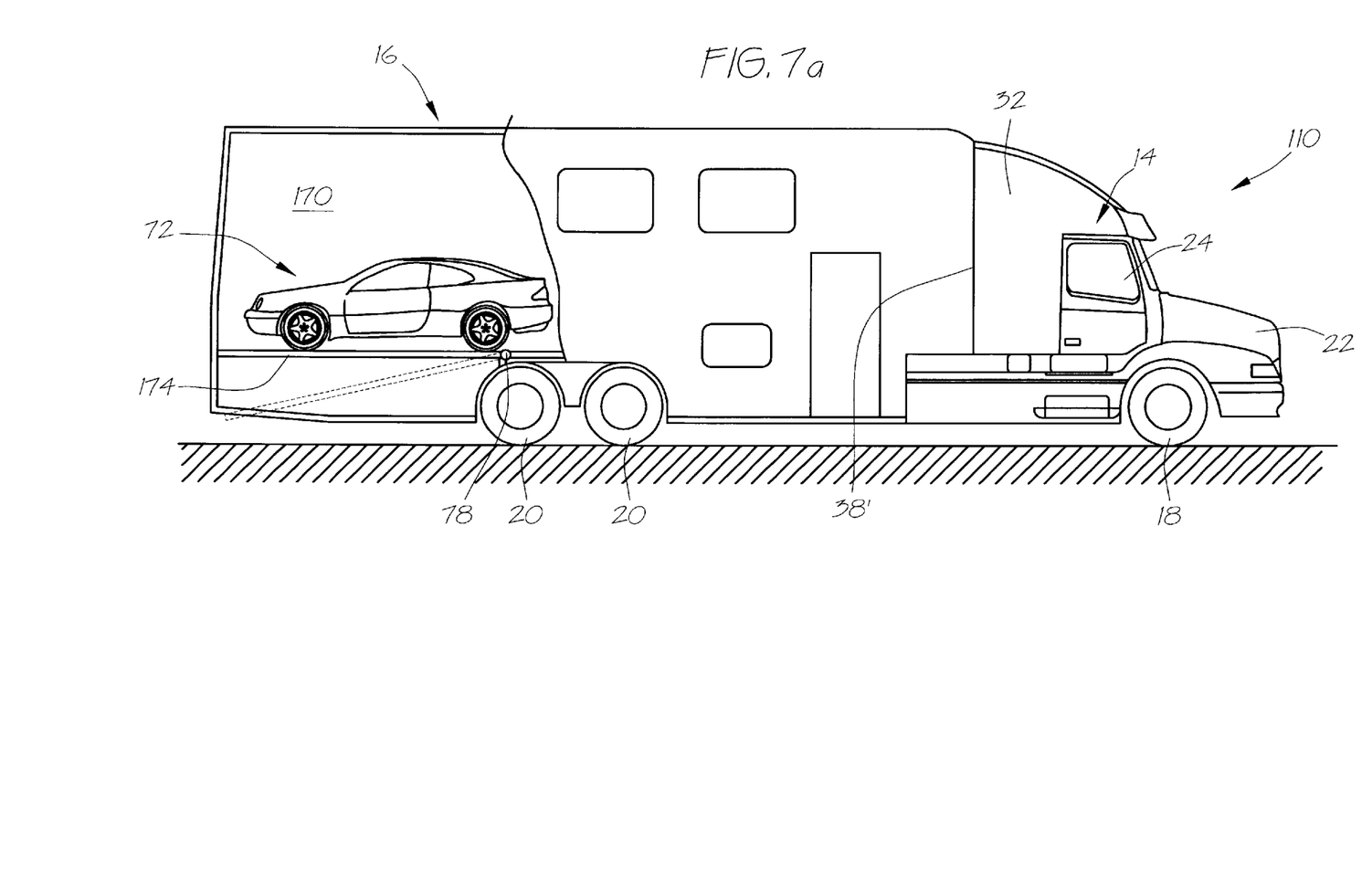
FIG. 7a is a schematic view of a motor coach having an alternative garage configuration according to teachings of the present invention, the garage having a tilting panel in position for stowing the auxiliary vehicle during travel.
Figure 7B:
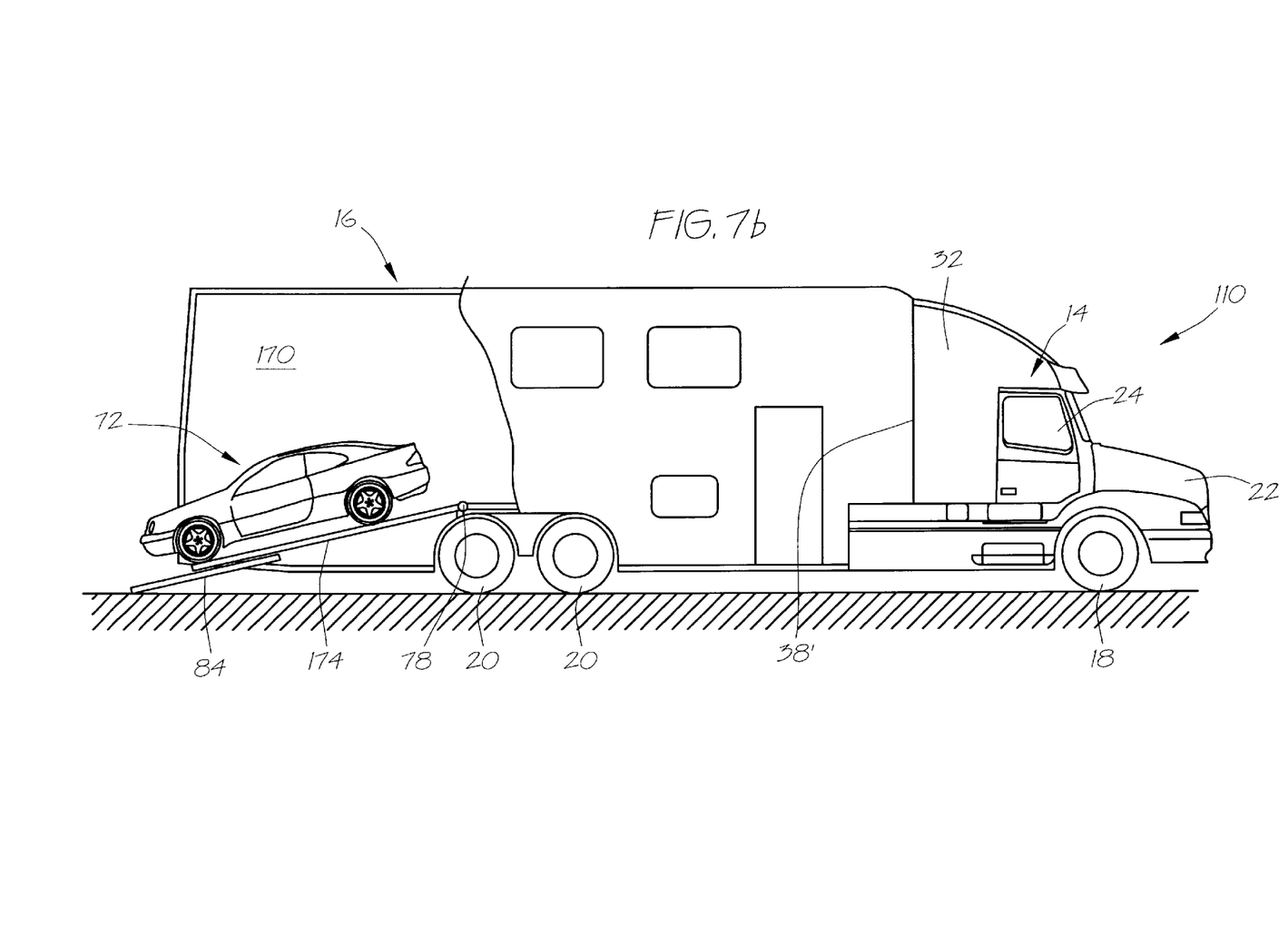
FIG. 7b is a schematic view of a motor coach of FIG. 7a wherein the tilting panel is in a position with pull-out ramps for loading or unloading the auxiliary vehicle.

Now turning to FIGS. 7a and 7b, a motor coach 110 is illustrated that includes an alternative garage 170. An entire floor 174 of the garage 170 is pivotably movable between a raised position, as shown in FIG. 7a, and a lowered position, as illustrated in FIG. 7b. In the raised position, the floor 174 may be generally horizontal. In the lowered position, the floor slopes downwardly for loading and unloading the auxiliary vehicle 72 with the assistance of pullout ramps 84 that are stored at an underside of the motor coach 10 when not in use.

In an embodiment, the motorcoach includes a sunken occupiable space or lower "room". In particular, between the side of the motorcoach and the frame, the sunken room has a floor mounted lower than frame level. In an embodiment, the lower room is under an elevated main living space. Just in front of the tandem axles on the curb-side of the truck conversion and just inside and to the left of the main entry is a lower compartment that can be utilized either as a lower bedroom on the Mobile Conference Center or Recreational Vehicle models or as a store for selling souvenirs and racing paraphernalia in the Showcar Truck Conversion. This lower compartment is made possible by the design of the main floor of the truck conversion. Twenty-sevenl inches into the custom body from where the tractor and custom body is joined is a step-up of 33 to 36 inches. The main floor is accessed from the tractor level by way of three steps centrally located in this area. A second option has the three steps along the wall on the street-side of the truck conversion. The floor to ceiling height in the main level is six feet and six inches. The lower compartment utilizes the space between the frame rails of the tractor and the elevated main floor as well as the space between the frame rails and the curb-side wall of the conversion. The overall length of the lower compartment ranges from six feet to eight feet long. The width is five feet. The section over the frame rails has a 33 to 36 inch height. The area between the frame rails and the curb-side wall has an overall height of five feet one inch to five feet four inches. As mentioned earlier, this lower compartment is used as a store in the Showcar Truck Conversion. Customers access the store by way of a hinged section of the curb-side wall which folds down vertically and rests against the outer wall of the conversion. This creates an open window in the side of the tuck that is used for vending. It is designed to be at a height that easily facilitates its use.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A motor coach comprising:

a truck frame including at least one generally horizontal rail, the frame having a front end with a front axle and a rear end with at least one rear axle;

a front body portion mounted generally to a front of the frame, the front body portion containing a driver compartment and an engine compartment generally forward of the driver compartment; and a rear body portion mounted to the frame behind the front body portion, wherein the rear body portion has multiple levels with sufficient headroom to permit an average person to stand at least partially erect, the multiple levels including an elevated level having a floor on or above the frame and a lower level having a floor below the frame.

2. The motor coach of claim 1, wherein the rails of the frame extend generally centrally through the motor coach, the floor of the lower level being disposed between the frame and a side of the rear body portion.

3. The motor coach of claim 1, wherein the rails of the frame extend generally centrally through the motor coach, the floor of the lower level having a starboard floor portion disposed between the frame and a starboard side of the rear body portion and a port floor portion disposed between the frame and a port side of the rear body portion.

4. The motor coach of claim 3, wherein the lower level includes a pass-through that extends above the frame between the starboard and the port sides of the lower level.

* * * * *